Feb. 16, 1932.   G. J. DANIELL   1,845,960
AIRCRAFT BRAKING DEVICE
Filed July 31, 1930   2 Sheets-Sheet 1

WITNESSES

INVENTOR
George J. Daniell
BY
ATTORNEYS

Feb. 16, 1932. G. J. DANIELL 1,845,960
AIRCRAFT BRAKING DEVICE
Filed July 31, 1930 2 Sheets-Sheet 2
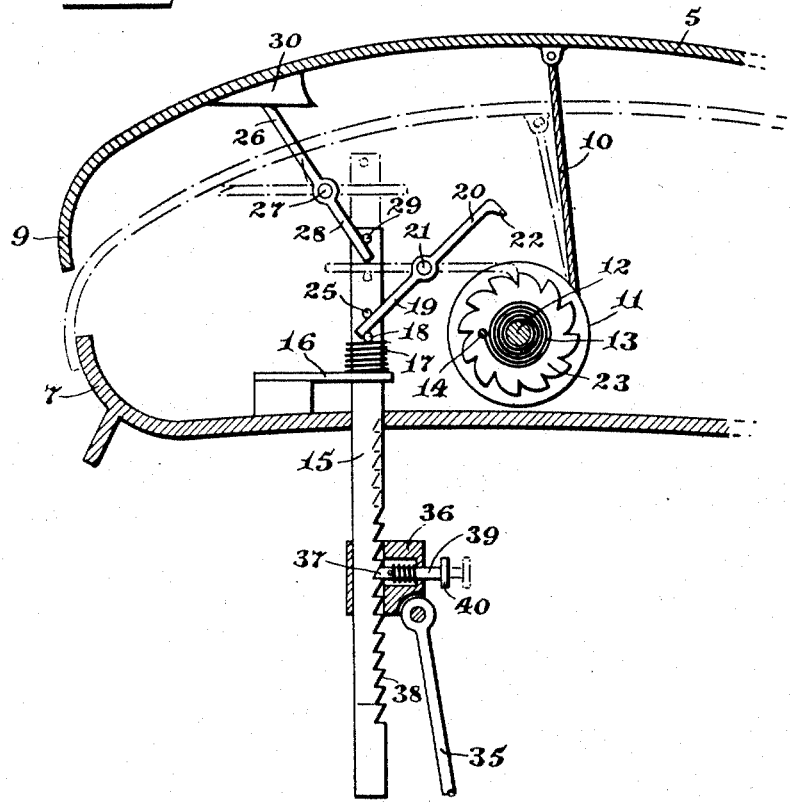
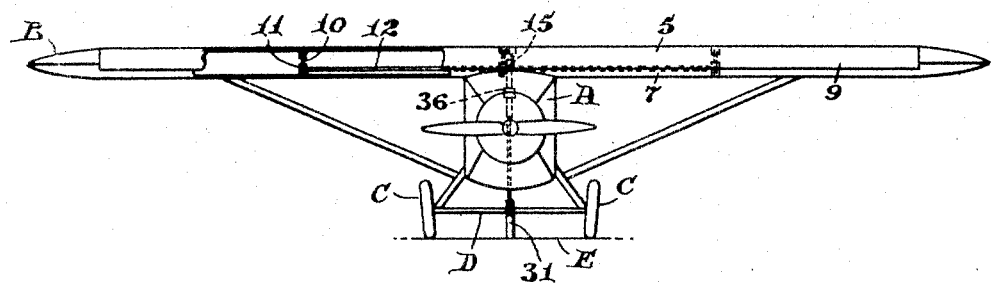
WITNESSES
INVENTOR
George J. Daniell
BY
ATTORNEYS Patented Feb. 16, 1932

1,845,960

UNITED STATES PATENT OFFICE

GEORGE J. DANIELL, OF BROOKLYN, NEW YORK, ASSIGNOR OF ONE-HALF TO GEORGE E. OSBORNE, OF BROOKLYN, NEW YORK

AIRCRAFT BRAKING DEVICE

Application filed July 31, 1930. Serial No. 472,123.

This invention relates generally to aircraft and comprehends an accessory for an airplane in the nature of a brake, which, when rendered active, produces increased head resistance for arresting the forward motion of the craft.

Broadly, the invention aims to provide an improved brake for an airplane including a head resistance panel which is capable of movement from a normally inactive locked position to an active position and which may be either manually or automatically released.

The invention more particularly resides in a brake for an airplane which will be automatically rendered active upon landing, to reduce to a minimum the run of the craft after landing, and this without causing the craft to nose down.

More specifically the invention comprehends in a brake for an airplane, a panel constituting a section of the wing or airfoil which is fulcrumed at the rear or aft portion and which is provided with a front or fore portion which extends around the leading edge of the wing structure so as to be normally in a non-obstructing position when not in active use.

The invention further embodies a brake panel for an airplane which is tensioned against movement to an operative position in order to cushion the shock of the head resistance offered to the forward movement of the craft by said panel.

Other objects of the invention reside in the comparative simplicity of construction of the brake, the economy with which it may be produced and installed on an airplane and the general efficiency derived therefrom.

With the above recited and other objects in view, reference is had to the following description and accompanying drawings in which there is exhibited one example or embodiment of the invention, while the claims define the actual scope of the same.

In the drawings:

Figure 2 is a similar enlarged fragmentary view illustrating the initial movement of the brake from its inactive to its active position.

Figure 3 is a front view on a reduced scale with parts broken away and shown in section.

Figure 1:
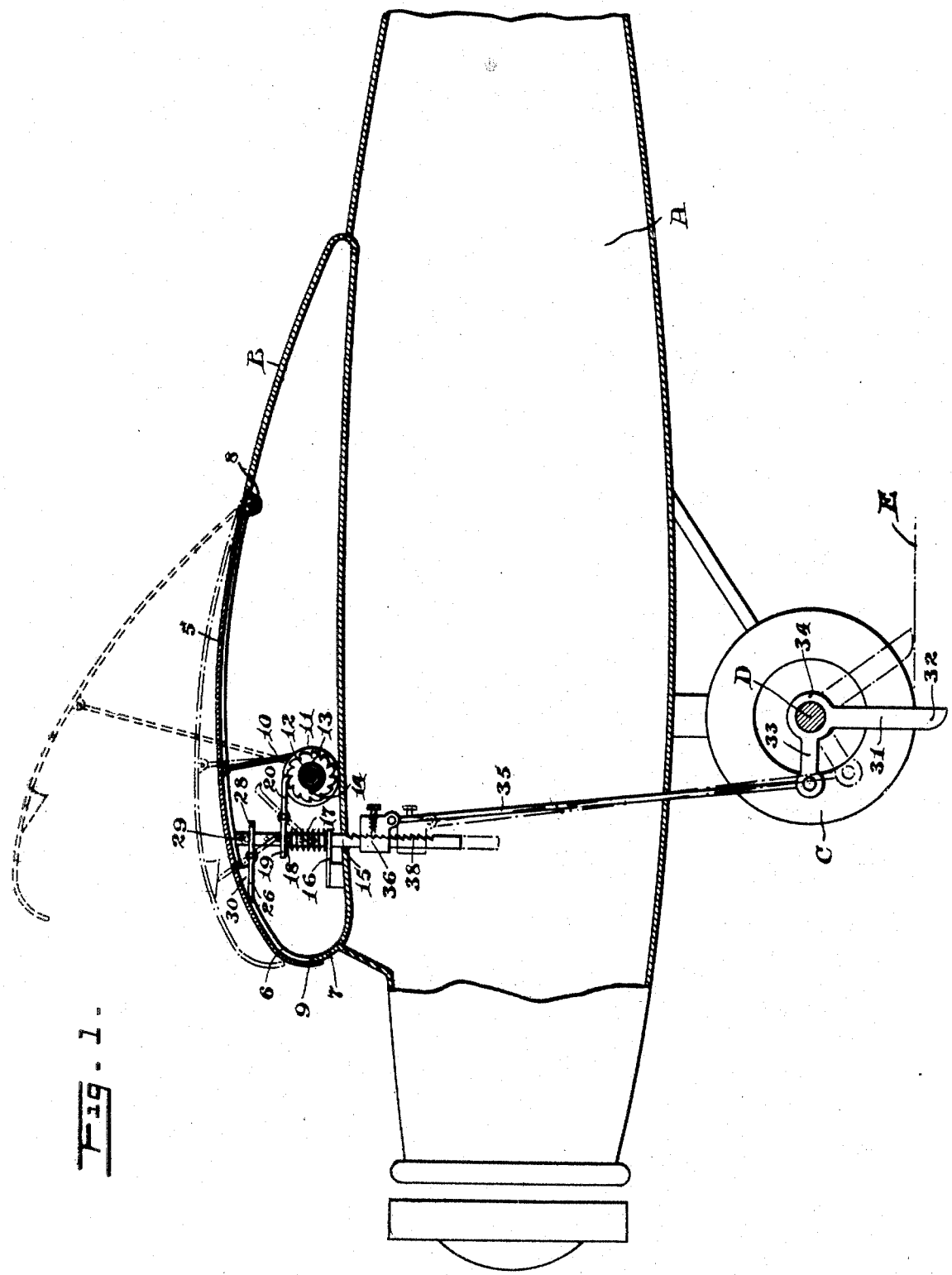
Figure 1 is a fragmentary longitudinal sectional view through an airplane equipped with a brake constructed in accordance with the invention and illustrating in full and broken lines the inactive and active positions of the parts.

Referring to the drawings by characters of reference A designates the fuselage of an airplane, B the wing structure, C the ground wheels and D the axle upon which said wheels are mounted on the undercarriage of the craft. It is, of course, to be understood that the invention may be applied to various types of airplanes other than the one shown and that obviously this will require certain alterations in the installation or arrangement of parts without affecting the conceptive idea.

In the present instance, the craft is of the monoplane type with an overhead wing or airfoil B and in this type a single brake panel 5 is employed which preferably constitutes a section of the wing or airfoil B, preferably the forward and upper part thereof. The wing is cut away at the point where the panel is arranged to provide an opening 6 which extends into the leading edge 7 of the wing structure and the panel 5 is fulcrumed at its rear edge as at 8 to swing upwardly and rearwardly from its normal inactive position. The panel 5 is of the same contour of the portion of the wing structure provided with the opening 6 and its forward edge 9 extends downwardly and beyond the forward edge of the opening 6 to overlie and completely cover said opening 6. A plurality of cables 10 are attached to the underside of the panel 5 in advance of the longitudinal center thereof and said cables are wound upon drums 11 secured to a transverse shaft 12 for rotation with the shaft. The shaft has secured thereto one end of a spiral spring 13, the opposite end of which is anchored as at 14. The spring 13 functions to normally unwind for the purpose of turning the shaft in a direction to wind the cables 10 on the drums 11 and to exert a tension of gradually increasing force as the cables are unwound from the drums. It is, therefore, obvious that when the panel 5 is moved from its normal inactive position to permit the wind pressure to act thereagainst to swing the same to a further opened position, the tension of the spring will avoid a sudden swinging of the brake panel 5 to its full open position and cushion the shock of the head resistance offered to the forward motion of the craft by said panel. In other words, under the tension of the spring a sudden swinging movement of the brake panel is avoided.

In order to provide means for controlling the action of the brake panel 5, a rack bar 15 is mounted in a suitable bearing 16 for vertical movement and said rack bar is normally elevated by a coiled expansion spring 17 which is interposed within the bearing 16 and a transverse pin 18. The pin 18 of the rack bar 15 also bears against the arm 19 of a latch lever 20 which is fulcrumed as at 21 and which is provided with a nose 22 engageable with the teeth of a ratchet wheel 23 secured on the drum shaft 12. From this arrangement it is apparent that the spring 17 normally functions to move the rack bar 15 upwardly to dispose the nose of the latch lever in engagement with the ratchet wheel 23 to lock the brake panel 5 in the inactive position shown in full lines in Figure 1 and in dot and dash lines in Figure 2. A transverse release pin 25 engages over the arm 19 of the latch lever 20 and functions upon downward movement of the rack bar 15 to swing the lever from a normal horizontal active engaging position with the ratchet wheel 23 to an inactive released position.

In order to provide means for initially raising the forward edge 9 of the brake panel a sufficient distance to permit the wind pressure to enter and swing the same to a full active open position, a kicker lever 26 is provided which is fulcrumed as at 27. The kicker lever 26 is normally disposed horizontally as illustrated in full lines in Figure 1 and is provided with a tail 28 which is disposed under an actuator pin 29 extending transversely through the upper end of the rack bar 15 but slightly spaced therebelow so that the initial downward movement of the rack bar 15 first functions to disengage the nose 22 of the latch lever from the ratchet wheel 23 before the actuator pin 29 contacts with and swings the kicker lever 26 downwardly. The kicker lever cooperates with a lug 30 on the underside of the brake panel 5 and effects the initial raising of the panel when the rack bar is moved downwardly.

In order to provide means for automatically shifting the rack bar downwardly against the action of the spring 17 when the craft lands, a trip arm 31 is provided which is fulcrumed on the axle D and which normally gravitates to a position where the lower free extremity 32 of the arm projects below the periphery of the wheel C. The trip arm is provided with an angularly disposed horizontal projecting terminal 33 at its fulcrumed hub portion 34 and the terminal 33 is connected by means of a link rod 35 to a slide 36 which is carried by the rack bar 15. The slide 36 is formed with a spring pressed ratchet pawl 37 which is normally engaged with the ratchet teeth 38 of the rack bar 15 and maintained against relative downward movement while permitted to freely move upwardly as the pawl ratchets over the teeth 38. The pawl is provided with an outwardly projecting shank 39 having a disposed manipulating head 40 by means of which the pawl may be retracted manually.

In operation of the device automatically upon landing, the trip arm 31 is moved from the full line position illustrated in Figure 1 to the dotted line position by contact with the ground or landing surface E. The swinging of the trip arm to the dotted line position exerts a pull on the link 35 which causes the slide 36 to shift the rack bar 15 downwardly against the action of the spring 17. The pin 25 engaging with the arm 19 of the latch lever initially swings the nose 22 out of engagement with the ratchet 23 and immediately thereafter causes the actuator pin 29 to swing the kicker lever 26 from its normal horizontal position to the angular position shown in dot and dash lines in Figure 1. The engagement of the kicker lever 26 with the lug 30 raises the brake panel 5 approximately to the position illustrated in dot and dash lines in Figure 1. The air pressure caused by the forward motion of the craft enters the opening 6 under the elevated forward portion of the brake panel 5 and acts against said brake panel to further lift the same to the position illustrated in dash lines in Figure 1. This exerts a pull on the cables 10, winding the spring 13, the tension of which gradually increases as the head resistance offered by the brake panel increases. Obviously, the additional head resistance offered by the brake panel 5 will gradually arrest the forward motion of the craft until it is brought to a stop. This decreases to a minimum the run of the craft after landing and permits of the landing of the same on a small landing surface. It is also apparent that due to the fact that the head resistance offered by the brake panel 5 is increased, the tendency of the craft to nose down is eliminated and, as a matter of fact, an increased tendency to hold the tail of the craft down is evident.

After the craft has come approximately to a stop, the spring 13 will function to again swing the brake panel 5 downwardly to approximately the position illustrated in dot and dash lines in Figures 1 or full lines in Figure 2. Before launching the craft again, the pilot or operator pulls out on the manipulating head 40 of the pawl 37, permitting the spring 17 to reset the rack bar 15 thereby permitting the spring 13 to initially wind the cables 10 on the drums 11 and reengaging the nose 22 of the latch lever 20 with the ratchet wheel 23. As soon as the craft leaves the ground the weight of the trip arm will cause the same to gravitationally move to a vertical position thereby sliding the slide 36 through the medium of the link 35 upwardly where the ratchet pawl 37 will reengage with the proper ratchet tooth 38 of the rack bar 15 so that the device is again in a position to repeat the automatic function.

What is claimed is:

1. An airplane brake comprising in combination with a wing having an opening in the forward portion of its upper surface, and a panel normally closing said opening and adapted to be moved to an open position for pocketing the air within the wing and to offer an increased head resistance to the forward motion of the craft, said panel being shaped to the contour of the wing surface against which it lies, the forward edge being directed outwardly and extending below the medial horizontal portion of the leading edge of the wing.

2. A brake for an airplane including a panel movable from a normally closed inactive position to an open active position to produce an increased head resistance and mechanism for normally locking said panel in its closed inactive position and for tensioning the same against movement to its open active position including a rotary drum, a cable secured to the wing and drum and normally wound thereabout, a spiral spring for normally winding the cable about the drum and adapted to be placed under tension when the cable is unwound from the drum.

3. A brake for an airplane including a panel movable from a normally closed inactive position to an open active position to produce an increased head resistance and mechanism for normally locking said panel in its closed inactive position and for tensioning the same against movement to its open active position including a rotary drum, a cable secured to the wing and drum and normally wound thereabout, a spiral spring for normally winding the cable about the drum and adapted to be placed under tension when the cable is unwound from the drum, ratchet means for normally holding the drum against unwinding and means for releasing said ratchet means.

4. A brake for an airplane including a panel movable from a normally closed inactive position to an open active position to produce an increased head resistance and mechanism for normally locking said panel in its closed inactive position and for tensioning the same against movement to its open active position including a rotary drum, a cable secured to the wing and drum and normally wound thereabout, a spiral spring for normally winding the cable about the drum and adapted to be placed under tension when the cable is unwound from the drum, ratchet means for normally holding the drum against unwinding, means for releasing said ratchet means and means for partially opening the panel following the release of the ratchet means.

5. A brake for an airplane including a panel movable from a normally closed inactive position to an open active position to produce an increased head resistance and mechanism for normally locking said panel in its closed inactive position and for tensioning the same against movement to its open active position including a rotary drum, a cable secured to the wing and drum and normally wound thereabout, a spiral spring for normally winding the cable about the drum and adapted to be placed under tension when the cable is unwound from the drum, ratchet means for normally holding the drum against unwinding, means for releasing said ratchet means and means for partially opening the panel following the release of the ratchet means operable by the ratchet releasing means.

GEORGE J. DANIELL.